Aug. 13, 1957 W. E. JECKELL ET AL 2,802,519
AUTOMOBILE ARMREST
Filed April 23, 1954

WALTER E. JECKELL
ERNEST A. JECKELL
*INVENTORS*

BY Robert C. Comstock

THEIR ATTORNEY

United States Patent Office 2,802,519
Patented Aug. 13, 1957

2,802,519

AUTOMOBILE ARMREST

Walter E. Jeckell, Huntington Park, and Ernest A. Jeckell, North Long Beach, Calif.

Application April 23, 1954, Serial No. 425,121

3 Claims. (Cl. 155—198)

This invention relates to an automobile arm rest.

It is an object of our invention to provide an arm rest for the interior of an automobile which is far more economical to construct and install than the arm rests which are now in use. At the present time, the conventional automobile arm rest is a complicated and expensive article. It customarily comprises an assembly comprising a metal framework, on which is mounted padding or sponge rubber, the assembly being covered with a fabric material, which must be sewed. The result is that the arm rest requires a substantial amount of upholstery work and is expensive in both labor and materials. The arm rest is in fact so costly that it is regarded as a luxury which is omitted from the less expensive models of many automobiles.

It is an object of our invention to provide an arm rest which requires no upholstery, no sewing and substantially no labor whatsoever to construct or install. Our automobile arm rest is so economical that it can be installed in every automobile, without adding substantially to the cost.

The automobile arm rest of our invention is also adapted to be used as a replacement either for the same type of arm rest or for the type of arm rests which are now in use. The cloth cover of the present day arm rest quickly becomes worn and shabby in use, but replacement is so expensive as to not be feasible. Our arm rest can be easily, quickly and economically used as a replacement for such a worn arm rest. The preferred embodiment of our arm rest is not subject to such wear, since it has no upholstery or cloth covering.

It is particularly an object of our invention to provide a complete automobile arm rest which is formed of molded plastic material. Such an arm rest is capable of being manufactured in extremely large quantities at extremely low cost and will enable automobile manufacturers to include arm rests in all of their models and to lessen their manufacturing costs on models which already provide arm rests. Our molded plastic arm rest is also adapted to be used as a replacement for arm rests now in use, providing a simple, quickly installed replacement at far less cost than that of an upholstered arm rest assembly furnished by the manufacturer.

It is a further object of our invention to provide an arm rest which is attractive in appearance and which will function in the same manner as the arm rests now in use, including serving as a door pull as well as an arm rest.

Our invention also comprises such other objects, advantages and capabilities as will later more fully appear and which are inherently possessed by our invention.

While we have shown in the accompanying drawings preferred embodiments of our invention, it should be understood that the same are susceptible of modification and change without departing from the spirit of our invention.

Referring to the drawings, Fig. 1 is a top perspective view of a preferred embodiment of our automobile arm rest, taken from the rear of the same;

Figure 2:
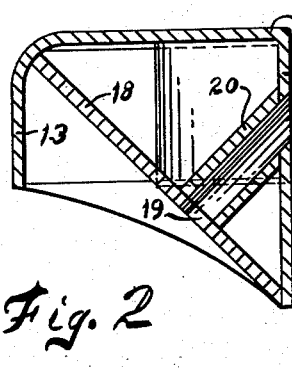
Fig. 2 is a sectional view of the same taken on line 2—2 of Fig. 1.
Figure 3:
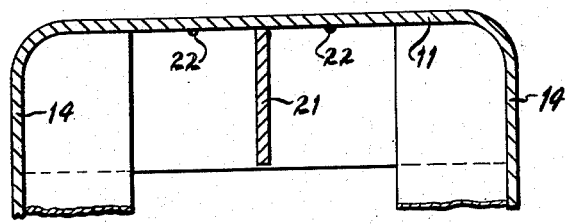
Fig. 3 is a sectional view of the same taken on line 3—3 of Fig. 1.
Figure 1:
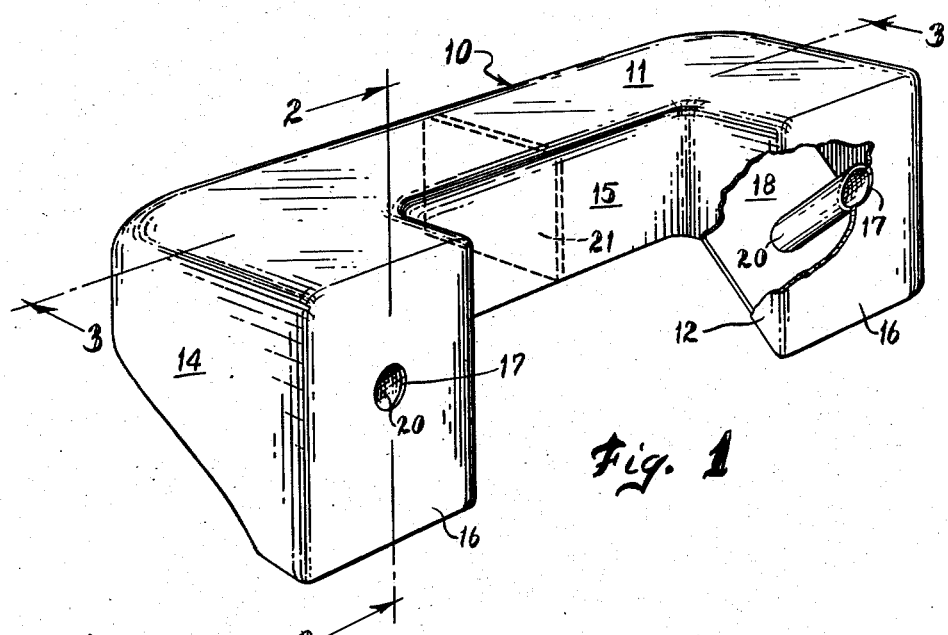

A preferred embodiment which has been selected to illustrate our invention comprises a hollow substantially U-shaped body member 10 which is preferably formed of molded plastic. Body member 10 comprises a base and a pair of short legs extending at a right angle therefrom adjacent the opposite ends of the base. The materials used in making body member 10 may vary, but should provide sufficient strength to resist breaking. Among the materials which are believed to be suitable for the purpose and which may be used are styrene, phenol-formadehyde, urea-formadehyde, cellulose acetate and other plastics which are well known to the art. The plastics may be filled in the conventional manner with such fillers as wood flour, cotton linters, glass fiber or the like.

Body member 10 has a flat substantially U-shaped top 11, which may be provided with suitable ornamentation (not shown) which is molded directly into the plastic. Such ornamentation may, for example, comprise a distinct pattern, a trade mark or a design to match the interior of the automobile. The ornamentation may also serve as a roughening of the surface of top 11, in order to provide a frictional surface to hold the arm or elbow of the user.

Depending downwardly at substantially a right angle from the front edge of top 11 is an integral front skirt 13, which extends across the entire front of body member 10 and which continues to provide downwardly extending end skirts 14, which are substantially triangular in shape, being longer adjacent the rear edge of body member 10. Depending downwardly at substantially a right angle from the inside edge of top 11 is an integral rear skirt 15, which extends across the inside portion of body member 10, continuing to provide downwardly extending inside skirts 12, which are substantially triangular in shape, being longer adjacent the rear edge of body member 10.

Depending downwardly from the ends of legs of top 11 are a pair of substantially rectangular end portions 16, each of which is provided with a centrally disposed circular opening 17. Mounted within the legs of body member 10 are a pair of braces 18. Braces 18 extend between end skirts 14 and inside skirts 12 diagonally from the inside of the front edge of top 11 to the inside of the bottom of end portions 16. Braces 18 may be molded integrally with body member 10 or may be mounted therein by adhesion or fusion or in any other manner desired. Braces 18 are provided with circular openings 19, which correspond in dimension to openings 17 and which are positioned downwardly and forwardly therefrom.

A pair of tubular members 20 extend between openings 17 and 19 to provide mounting means for a bolt or other fastening device to extend therethrough. Tubular members 20 may be molded integrally with body member 10 or may be mounted therein.

A substantially rectangular reinforcement 21 is mounted within body member 10 adjacent the center thereof, extending between front skirt 13 and rear skirt 15, beneath the center of top 11. Reinforcement 21 provides added strength to resist any force tending to move front skirt 13 and rear skirt 15 toward each other and serves to strengthen body member 10 generally. A pair of ribs 22 extend parallel to reinforcement 21 beneath top 11 to provide further strengthening of top 11.

Additional reinforcing means may be provided, if deemed necessary or desirable. It should be understood that the thickness of the walls and the type and positioning of reinforcing means necessary to obtain the desired strength and rigidity may vary and are within the skill of the art.

In use, our arm rest is mounted so that end portions 16 engage the side of the automobile door or mounting surface to which the arm rest is to be attached. A bolt or other fastening device is mounted through opening 19, tubular member 20 and opening 17 into a corresponding opening in the mounting surface. An arm rest of the construction shown may be used with the type of mounting now in use in most automobiles. If desired, the shaft 19 may be omitted and the bolt will then extend between openings 19 and 17.

Figure 4:
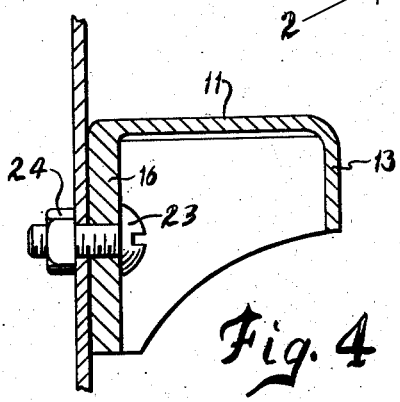
Fig. 4 is a sectional view of another embodiment of our invention, showing the same in use.

Another embodiment of our invention is shown in Fig. 4 of the drawings. In this embodiment, the end portions 16 of body member 10 are considerably thicker and stronger and the braces 18 and shaft 20 have been eliminated. A bolt 23 is mounted through opening 17 and held in place by a nut 24. Any other type of fastening means may, of course, be used.

In use, our arm rest may be manufactured in large quantities at extremely low cost. It may be installed with the same methods, devices and positioning now in use and may in fact serve as a replacement for the conventional arm rest which is now in use. It requires no cutting, sewing, leather or upholstery work of any kind and is more resistant to wear than an upholstered arm rest. It may be made of any desired color, design and ornamentation. It may be made sufficiently strong to act as a door pull as well as an arm rest.

If desired, our arm rest may be made of a soft or resilient plastic material such as suitable flexible resins, neoprene, nylon 66, polyethylene, polyvinyl chloride, polyvinyl acetate or other suitable material.

In such case, as well as in the embodiments described above, a suitable supporting block of wood, metal or other material corresponding in size and shape to the interior of the body member 10 may be used to provide the necessary strength and rigidity. Such block may be provided with a suitable cylindrical opening to accommodate the mounting means and in use would be concealed from sight within body member 10.

We claim:

1. An automobile arm rest comprising a hollow U-shaped body member having a substantially flat top, a skirt depending downwardly from said top around the front of said body member, a pair of side skirts depending downwardly from said top along the sides of said body member, said side skirts being substantially triangular in shape with their rear edges longer than their front edges, a skirt depending downwardly from said top at the inside of the U-shaped body member, a pair of inside skirts depending downwardly from said top and corresponding to said side skirts, a pair of substantially rectangular end portions depending downwardly from said top adjacent the ends of the legs of the U-shaped body member, each of said end portions having an opening therein, a brace mounted within each of the ends of said body member, each of said braces extending between said outside side and inside side skirts and diagonally from adjacent the bottom of said end portions to adjacent the inside of said top, each of said braces having an opening therein, a hollow tubular member mounted between each of said braces and end portions connecting said openings, and reinforcing means disposed within the hollow interior of said body member to furnish sufficient rigidity so that said arm rest will function as an arm rest and as a door pull, said tubular member adapted to receive and hold mounting means to attach said arm rest to an automobile.

2. An automobile arm rest comprising a hollow U-shaped body member having a substantially flat top, a skirt depending downwardly from said top around the front of said body member, a pair of side skirts depending downwardly from said top along the sides of said body member, a skirt depending downwardly from said top at the inside of the U-shaped body member, a pair of inside skirts depending downwardly from said top and corresponding to said side skirts, a pair of end portions depending downwardly from said top adjacent the ends of the legs of the U-shaped body member, each of said end portions having an opening therein, a brace mounted within each of the ends of said body member, each of said braces extending between said outside side and inside side skirts and diagonally from adjacent the bottom of said end portions to adjacent the inside of said top, each of said braces having an opening therein, a hollow tubular member mounted between each of said braces and end portions connecting said openings, and reinforcing means disposed within the hollow interior of said body member to furnish sufficient rigidity so that said arm rest will function as an arm rest and as a door pull, said tubular member adapted to receive and hold mounting means to attach said arm rest to an automobile.

3. An automobile arm rest comprising a hollow U-shaped body member having a substantially flat top, a skirt depending downwardly from said top around the front of said body member, a pair of side skirts depending downwardly from said top along the sides of said body member, a skirt depending downwardly from said top at the inside of the U-shaped body member, a pair of inside skirts depending downwardly from said top and corresponding to said side skirts, a pair of end portions depending downwardly from said top adjacent the ends of the legs of the U-shaped body member, each of said end portions having an opening therein, and a brace mounted within each of the ends of said body member, each of said braces extending between said outside side and inside side skirts and diagonally from adjacent the bottom of said end portions to adjacent the inside of said top, each of said braces having an opening therein disposed adjacent but spaced from the opening in the adjacent end portion, the openings in said braces and end portions being adapted to receive and hold mounting means to attach said arm rest to an automobile.

References Cited in the file of this patent

UNITED STATES PATENTS

| | | |
|---|---|---|
| 1,555,396 | Bourgon | Sept. 29, 1925 |
| 2,569,834 | Smith | Oct. 2, 1951 |
| 2,581,203 | Rakas | Jan. 1, 1952 |
| 2,601,677 | Wettlaufer | June 24, 1952 |
| 2,633,186 | Jeckell | Mar. 11, 1953 |
| 2,677,415 | Brink | May 5, 1954 |
| 2,703,602 | Greenstadt | Mar. 8, 1955 |